US007167187B2

(12) United States Patent
Scott et al.

(10) Patent No.: US 7,167,187 B2
(45) Date of Patent: Jan. 23, 2007

(54) SYSTEM AND METHOD FOR GEOREFERENCING DIGITAL RASTER MAPS USING A GEOREFERENCING FUNCTION

(75) Inventors: Dan Martin Scott, Irving, TX (US); Darin Wayne Higgins, Fort Worth, TX (US)

(73) Assignee: SourceProse Corporation, Euless, TX (US)

(*) Notice: Subject to any disclaimer, the term of this patent is extended or adjusted under 35 U.S.C. 154(b) by 149 days.

(21) Appl. No.: 09/820,557

(22) Filed: Mar. 29, 2001

(65) Prior Publication Data

US 2001/0033290 A1  Oct. 25, 2001

Related U.S. Application Data

(63) Continuation of application No. 09/537,849, filed on Mar. 29, 2000.

(51) Int. Cl.
G09G 5/12 (2006.01)
G09G 5/14 (2006.01)
(52) U.S. Cl. .................................................. 345/629
(58) Field of Classification Search ................ 345/427, 345/569, 665, 667, 682, 629, 634, 650; 702/2
See application file for complete search history.

(56) References Cited

U.S. PATENT DOCUMENTS

| 4,254,467 A | 3/1981 | Davis et al. |
| 4,458,330 A | 7/1984 | Imsand et al. |
| 4,737,916 A | 4/1988 | Ogawa et al. ............. 364/443 |
| 4,852,183 A | 7/1989 | Abe et al. |
| 4,876,651 A | 10/1989 | Dawson et al. |
| 4,885,706 A | 12/1989 | Pate et al. ............. 364/551.01 |
| 4,899,136 A | 2/1990 | Beard et al. ............. 340/706 |
| 5,018,210 A | 5/1991 | Merryman et al. |
| 5,050,222 A | 9/1991 | Lee |
| 5,113,517 A | 5/1992 | Beard et al. ............. 364/200 |
| 5,124,915 A * | 6/1992 | Krenzel ............. 702/5 |
| 5,233,335 A | 8/1993 | Berwin |

(Continued)

FOREIGN PATENT DOCUMENTS

EP  WO 90/14627  11/1990

(Continued)

OTHER PUBLICATIONS

Noah Radford, "The Use of GIS in Flood Hazard Analysis: A Report for the City of Warwick and Project Impact," Jun. 1999.

(Continued)

*Primary Examiner*—Kee M. Tung
*Assistant Examiner*—J. Amini
(74) *Attorney, Agent, or Firm*—Finnegan, Henderson, Farabow, Garrett & Dunner L.L.P.

(57) ABSTRACT

A method, computer-readable medium and apparatus for georeferencing a raster map. A first map is displayed in one area of a display, wherein the first map is a digital raster map. A second map is displayed in a second area of the display, wherein the second map is a georeferenced map that displays at least a portion of an identical geographic region displayed in the raster map. A user selects a point on the first map, and then selects a point on the second map, wherein the point selected on the second map corresponds to the point selected on the first map. Next, a geographic coordinate associated with the point selected on the second map is assigned to the corresponding point selected on the first map. These operations are repeated, i.e., selecting a point on the first map, selecting a point on the second map and assigning a geographic coordinate at least a second time.

20 Claims, 4 Drawing Sheets

U.S. PATENT DOCUMENTS

| | | | |
|---|---|---|---|
| 5,247,356 A * | 9/1993 | Ciampa | 348/144 |
| 5,274,752 A | 12/1993 | Kawazome | |
| 5,321,613 A * | 6/1994 | Porter et al. | 702/1 |
| 5,323,317 A * | 6/1994 | Hampton et al. | 702/3 |
| 5,381,338 A | 1/1995 | Wysocki et al. | |
| 5,396,582 A | 3/1995 | Kahkoska | |
| 5,406,342 A | 4/1995 | Jongsma | |
| 5,414,462 A | 5/1995 | Veatch | 348/135 |
| 5,418,906 A * | 5/1995 | Berger et al. | 702/5 |
| 5,422,989 A * | 6/1995 | Bell et al. | 345/689 |
| 5,428,546 A * | 6/1995 | Shah et al. | 701/207 |
| 5,467,271 A * | 11/1995 | Abel et al. | 702/5 |
| 5,487,139 A * | 1/1996 | Saylor et al. | 345/629 |
| 5,592,375 A | 1/1997 | Salmon et al. | 395/207 |
| 5,594,650 A | 1/1997 | Shah et al. | |
| 5,596,494 A | 1/1997 | Kuo | 364/420 |
| 5,608,858 A | 3/1997 | Kurosu et al. | |
| 5,623,679 A | 4/1997 | Rivette et al. | |
| 5,623,681 A | 4/1997 | Rivette et al. | |
| 5,631,970 A | 5/1997 | Hsu | |
| 5,638,501 A | 6/1997 | Gough et al. | |
| 5,640,468 A | 6/1997 | Hsu | |
| 5,659,318 A | 8/1997 | Madsen et al. | |
| 5,682,525 A | 10/1997 | Bouve et al. | |
| 5,699,244 A | 12/1997 | Clark, Jr. et al. | 364/420 |
| 5,699,255 A | 12/1997 | Ellis et al. | |
| 5,715,331 A | 2/1998 | Hollinger | |
| 5,719,949 A * | 2/1998 | Koeln et al. | 382/113 |
| 5,734,756 A | 3/1998 | Sherman et al. | |
| 5,748,777 A | 5/1998 | Katayama et al. | |
| 5,748,778 A | 5/1998 | Onoguchi | |
| 5,757,359 A * | 5/1998 | Morimoto et al. | 345/156 |
| 5,771,169 A * | 6/1998 | Wendte | 702/5 |
| 5,815,118 A | 9/1998 | Schipper | 342/451 |
| 5,842,148 A | 11/1998 | Prendergast et al. | 702/34 |
| 5,848,373 A * | 12/1998 | DeLorme et al. | 701/200 |
| 5,857,199 A | 1/1999 | Tamano et al. | |
| 5,884,216 A | 3/1999 | Shah et al. | 701/207 |
| 5,884,219 A | 3/1999 | Curtwright et al. | |
| 5,892,909 A | 4/1999 | Grasso et al. | |
| 5,902,347 A | 5/1999 | Backman et al. | 701/200 |
| 5,904,727 A | 5/1999 | Prabhakaran | 701/208 |
| 5,907,630 A | 5/1999 | Naoi et al. | |
| 5,929,842 A | 7/1999 | Vertregt et al. | |
| 5,929,865 A | 7/1999 | Balz et al. | |
| 5,930,474 A | 7/1999 | Dunworth et al. | |
| 5,937,014 A | 8/1999 | Pelin et al. | |
| 5,961,572 A | 10/1999 | Craport et al. | |
| 5,966,135 A | 10/1999 | Roy et al. | |
| 5,966,469 A | 10/1999 | Moon et al. | |
| 5,969,723 A | 10/1999 | Schmidt | |
| 5,969,728 A | 10/1999 | Dye et al. | |
| 5,974,423 A | 10/1999 | Margolin | |
| 5,978,804 A | 11/1999 | Dietzman | |
| 5,986,697 A | 11/1999 | Cahill, III | |
| 5,987,136 A | 11/1999 | Schipper et al. | |
| 5,987,173 A | 11/1999 | Kohno et al. | |
| 5,987,380 A * | 11/1999 | Backman et al. | 701/208 |
| 5,991,780 A | 11/1999 | Rivette et al. | |
| 5,995,023 A | 11/1999 | Kreft | |
| 5,999,878 A | 12/1999 | Hanson et al. | |
| 6,005,509 A | 12/1999 | Buckreuss | |
| 6,006,161 A * | 12/1999 | Katou | 701/212 |
| 6,008,756 A | 12/1999 | Boerhave et al. | |
| 6,032,157 A | 2/2000 | Tamano et al. | 707/104 |
| 6,044,324 A * | 3/2000 | Boerhave et al. | 702/5 |
| 6,058,351 A * | 5/2000 | McCauley | 702/5 |
| 6,061,618 A * | 5/2000 | Hale et al. | 701/50 |
| 6,084,989 A * | 7/2000 | Eppler | 382/293 |
| 6,119,069 A * | 9/2000 | McCauley | 702/5 |
| 6,144,920 A * | 11/2000 | Mikame | 701/212 |
| 6,148,260 A | 11/2000 | Musk et al. | |
| 6,161,105 A * | 12/2000 | Keighan et al. | 707/100 |
| 6,202,023 B1 | 3/2001 | Hancock et al. | |
| 6,218,965 B1 | 4/2001 | Grendron et al. | |
| 6,236,907 B1 * | 5/2001 | Hauwiller et al. | 700/283 |
| 6,249,742 B1 | 6/2001 | Friederich et al. | |
| 6,307,573 B1 | 10/2001 | Barros | |
| 6,321,158 B1 | 11/2001 | DeLorme et al. | 701/201 |
| 6,339,745 B1 | 1/2002 | Novik | |
| 6,377,210 B1 * | 4/2002 | Moore | 342/357.13 |
| 6,377,278 B1 * | 4/2002 | Curtright et al. | 345/634 |
| 6,462,676 B1 | 10/2002 | Koizumi | 340/995 |
| 6,487,305 B1 | 11/2002 | Kambe et al. | 382/113 |
| 6,489,920 B1 * | 12/2002 | Anders et al. | 342/179 |
| 6,504,571 B1 | 1/2003 | Narayanaswami et al. | 348/231.99 |
| 6,505,146 B1 * | 1/2003 | Blackmer | 702/189 |
| 6,538,674 B1 | 3/2003 | Shibata et al. | |
| 6,549,828 B1 * | 4/2003 | Garrot et al. | 701/1 |
| 6,565,610 B1 | 5/2003 | Wang et al. | |
| 6,577,714 B1 | 6/2003 | Darcie et al. | |
| 6,606,542 B1 * | 8/2003 | Hauwiller et al. | 700/283 |
| 6,631,326 B1 | 10/2003 | Howard et al. | 702/5 |
| 6,650,998 B1 | 11/2003 | Rutledge et al. | |
| 6,678,615 B1 | 1/2004 | Howard et al. | 702/5 |
| 6,785,619 B1 * | 8/2004 | Homann et al. | 702/51 |
| 2001/0026270 A1 | 10/2001 | Higgins | |
| 2001/0026271 A1 | 10/2001 | Higgins | |
| 2001/0028348 A1 | 10/2001 | Higgins | |
| 2001/0033291 A1 | 10/2001 | Scott | |
| 2001/0033292 A1 | 10/2001 | Scott | |
| 2002/0035432 A1 | 3/2002 | Kubica et al. | |
| 2002/0143469 A1 | 10/2002 | Alexander et al. | |
| 2002/0145617 A1 | 10/2002 | Kennard et al. | |
| 2002/0147613 A1 | 10/2002 | Kennard et al. | |
| 2003/0052896 A1 | 3/2003 | Higgins | |

FOREIGN PATENT DOCUMENTS

| | | |
|---|---|---|
| EP | 0 454 129 A2 | 10/1991 |
| EP | 0 619 554 A2 | 10/1994 |
| JP | 11296540 A | 10/1999 |
| WO | WO 97/49027 | 12/1997 |

OTHER PUBLICATIONS

"R2V: Advanced Raster to Vector Conversion Software for Automated Map Digitizing," Able Software Corp., Sep. 20, 1999, pp. 1-4.

Susanna Jul, George W. Furnas, "Critical Zones in Desert Fog: Aids to Multi-scale Navigation," Nov. 1998.

Desney S. Tan, George G. Robertson, Mary C. Zerwinski, "Exploring 3D Navigation: Combining Speed-Coupled Flying with Orbiting," Mar. 2001.

Horace Mitchell, Robert Raskin, Ananth Rao, "The NASA Digital Earth Testbed," Nov. 2000.

U.S. Appl. No. 10/127,648, filed Apr. 22, 2002.

Reddy et al., "Under the Hood of GeoVRML 1.0," Proceedings of the Fifth Symposium on Virtual Reality Modeling Language (Web3D-VRML), Feb. 2000.

Burton et al, "Using High Performance GIS Software to Visualize Data: a Hands-On Software Demonstration," Proceedings of the 1998 ACM/IEEE Conference on Supercomputing (CDROM), Nov. 1998.

G. Wiederhold, "The Role of Governement in Standards," StandardView, Dec. 1993, vol. 1 Issue 2.

P. Wilson, "The Application of Computer Graphics to Environmental Planning," Proceedings of the ACM 1980 Annual Conference, Jan. 1980.

CDS Mapping Systems, et al., "CDS Business Mapping," Feb. 2, 1999. http://web.archive.org/web/19990202115053/www/cdsys.com/index.html.

GeoPlace.com et al., "Mapping Awareness," 1999 http://web.archive.org/web/20000301085059/www/geoplace.com/archives.asp.

Fekete, Jean-Daniel et al., "Using the Multi-layer Model for Building Interactive Graphical Applications," ACM, pp. 109-118, 1996.

WiseImage X Quick Start, Consistent Software, 2000-2005, p. 1-77.

WiseImage X for Windows, IDEAL.com, 2000-2005, p. 1-2.

Li et al., "Accuracy Assessment of Mapping Products Produced from the Star-3i Airborne IFSAR System".

Fukunaga et al., "Image Registration Using an Image Graph and its Application to Map Matching," IEE Proceedings-E, vol. 138, No. 2, Mar. 1991.

Wang, "Integrating GIS's and Remote Sensing Image Analysis Systems by Unifying Knowledge Representation Schemes," IEEE Transactions on Geoscience and Remote Sensing, vol. 29, No. 4, p. 656-664, Jul. 1991.

Roux, "Automatic Registration of Spot Images and Digitized Maps," IEEE, p. 625-628, 1996.

* cited by examiner

SYSTEM AND METHOD FOR GEOREFERENCING DIGITAL RASTER MAPS USING A GEOREFERENCING FUNCTION

CROSS REFERENCE TO RELATED APPLICATIONS

This application is a continuation of and claims priority from pending U.S. Application "System and Method for Georeferencing Digital Raster Maps" (Ser. No. 09/537,849), filed Mar. 29, 2000. Furthermore, this application is related to and claims priority from the following pending applications: "System and Method for Performing Flood Zone Certifications" (Ser. No. 09/537,161), filed Mar. 29, 2000 and "System and Method for Synchronizing Raster And Vector Map Images" (Ser. No. 09/537,162), filed Mar. 29, 2000 which are hereby incorporated by reference.

BACKGROUND OF THE INVENTION

1. Technical Field

The present invention generally relates to geographic map processing and in particular to a system and method for associating digital raster maps with known geographic features. Still more particularly, the present invention relates to a system and method for associating specific points on digital raster maps with a geographic coordinate system.

2. Description of the Related Art

A digital raster map is a computerized map image that resembles a conventional paper map in that it presents an image of the mapped area, but has no additional underlying data associated with the features of the map. A raster map is typically created by scanning a conventional paper map, and is a grid-based map composed of pixels (or dots) of color or black & white. Each pixel in the grid has can be referenced by the pixel coordinates, and has only one value, which indicates the color of that pixel. Raster images are commonly referred to as "bit mapped."

A vector map uses lines and polygons, rather than pixels, to describe an image. Unlike a raster map, in which the map image is simply stored as a grid of pixels, when a vector map is displayed, it is drawn from a set of underlying data. The vector map is created through the placements of nodes on a plane and connecting those nodes with lines. Vector lines can be attributed with tables of data such as elevations, values, names or other information relative to the line. Vector data can be displayed in three dimensions if the lines are attributed with z values, modified or changed relative to user need, or layered to allow for turning off and on the viewing of different information.

Because of their feature attribution properties, they are particularly useful for displaying geographic data. Vector maps are used to display boundaries or lines that denote the position and extent of features, such as county boundaries or lines denoting stream and river systems. It is also very easy to view or manipulate the data underlying a vector map, for example to view or change the elevation of a feature.

Also because vector maps are commonly drawn from a geographic data set describing the area shown, they are very easily, and generally inherently, georeferenced. Georeferencing is the process of relating source coordinates to referenced geographic coordinates, which are typically in standard latitude/longitude. An image or a vector file is georeferenced to be used within a mapping/geographic environment. In a vector map, the data from which the map is drawn will typically already include a geographic coordinate set.

Modem GIS systems normally make use of digital vector based map information. However, a vast legacy of paper-based map information exists. It is very expensive and time consuming to convert all of the information on these paper maps over to a digital vector format. In many cases the scope and expense of such conversions render them completely impractical. However, even when a complete conversion to digital vector-based format is not possible, it is still possible to obtain some of the benefits of computerized map systems, first by converting the paper maps to digital raster maps (by scanning them), and then by georeferencing the raster image. After georeferencing, there should be a clear relationship between the pixel coordinates in the raster map, and the geographic coordinates of the feature represented by that pixel. It would be desirable to provide a system and method for georeferencing a raster map by associating points on that map with corresponding points on a previously-georeferenced vector map, or with reference points designated in the raster map which have known latitude and longitude.

SUMMARY OF THE INVENTION

It is therefore one object of the present invention to provide improved geographic map processing.

It is another object of the present invention to provide an improved system and method for associating digital raster maps with known geographic features.

It is yet another object of the present invention to provide an improved system and method for associating specific points on digital raster maps with a geographic coordinate system.

The foregoing objects are achieved as is now described. The preferred embodiment provides a system and method for georeferencing digital raster maps by associating specific points on the raster map with corresponding points on a georeferenced vector map or another georeferenced raster map. According to the preferred embodiment, a raster map and a corresponding vector map are simultaneously displayed to a user. The user then locates a common geographic point or feature on each map, and marks each of them as a unique point-pair. When the user has marked at least two point-pairs, the system then computes a georeferencing function, based on the pixel-coordinates of the points marked on the raster map and the corresponding geographic coordinates of the points on the vector map. Thereafter the geographic coordinates of any point on the map may be easily computed. The preferred embodiment provides that as more point-pairs are identified, the georeferencing function is modified for increased accuracy.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
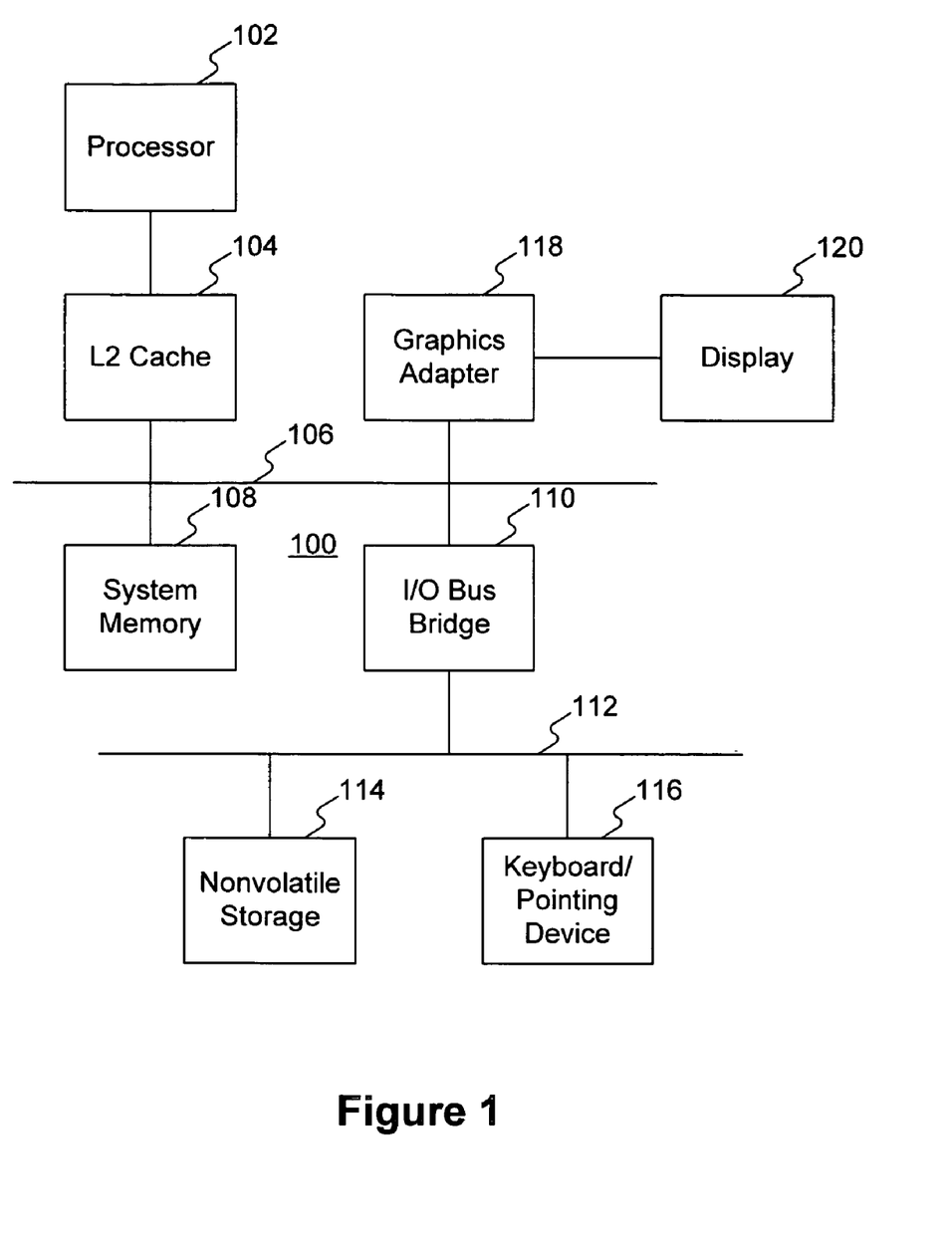
FIG. 1 depicts a data processing system in accordance with a preferred embodiment of the present invention.

With reference now to the figures, and in particular with reference to FIG. 1, a block diagram of a data processing system in which a preferred embodiment of the present invention may be implemented is depicted. Data processing system 100 includes processor 102 and associated L2 Cache 104, which in the exemplary embodiment is connected in turn to a system bus 106. System memory 108 is connected to system bus 106, and may be read from and written to by processor 102.

Also connected to system bus 106 is I/O bus bridge 110. In the exemplary embodiment, data processing system 100 includes graphics adapter 118 connected to bus 106, receiving user interface information for display 120. Peripheral devices such as nonvolatile storage 114, which may be a hard disk drive, and keyboard/pointing device 116, which may include a conventional mouse, a trackball, or the like, are connected to I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read only memory (CD-ROM) or digital video disk (DVD) drive, a sound card and audio speakers, and numerous other optional components. All such variations are believed to be within the spirit and scope of the present invention. Data processing system 100 is provided solely as an example for the purposes of explanation and is not intended to imply architectural limitations.

The preferred embodiment provides a system and method for georeferencing digital raster maps by associating specific points on the raster map with corresponding points on a georeferenced vector map or another georeferenced raster map. According to the preferred embodiment, a raster map and a corresponding vector map are simultaneously displayed to a user. The user then locates a common geographic point or feature on each map, and marks each of them as a unique point pair. When the user has marked at least two point-pairs, the system then computes a georeferencing function, based on the pixel-coordinates of the points marked on the raster map and the corresponding geographic coordinates of the points on the vector map. Thereafter the geographic coordinates of any point on the map may be easily computed. The preferred embodiment provides that as more point-pairs are identified, the georeferencing function is modified for increased accuracy.

Figure 2:
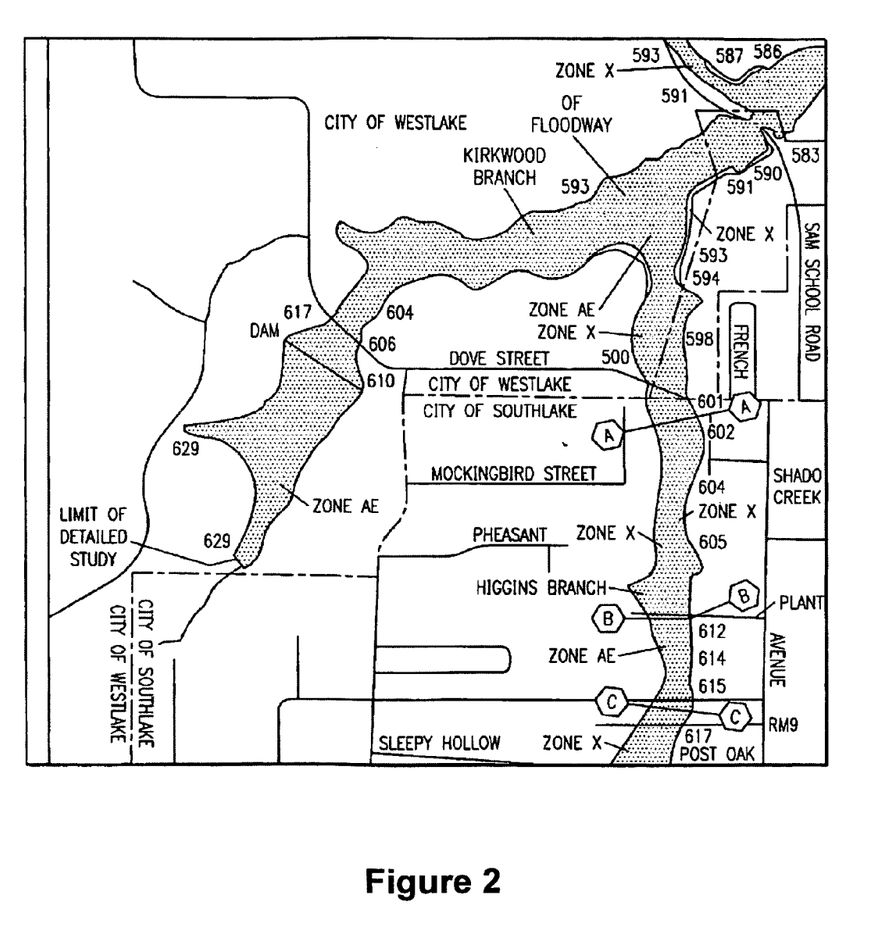
FIG. 2 is an image of an exemplary raster map, in accordance with the preferred embodiment.

FIG. 2 is an exemplary raster map, in accordance with the preferred embodiment. This exemplary map shows a scanned image from a Federal Emergency Management Agency (FEMA) paper map. This raster image shows a land area with flood zone indications, but would, in a computer system, contain no underlying data regarding the area shown.

Figure 3:
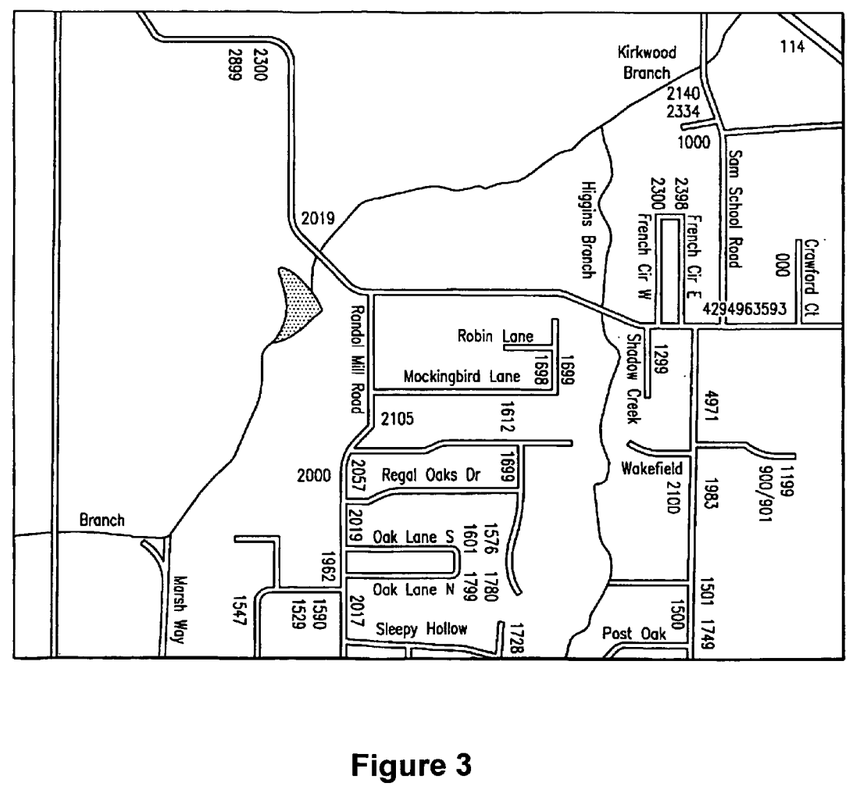
FIG. 3 is an image of an exemplary vector map, corresponding to the raster map of FIG. 2, in accordance with a preferred embodiment of the present invention.

FIG. 3 is an exemplary vector map, corresponding to the raster map of FIG. 2, in accordance with a preferred embodiment of the present invention. This map shows the same area as the map in FIG. 2, but is created by a computer system from a database describing the locations of features such as the streets shown. Typically, each feature shown on a vector map such as this will already be georeferenced, in that the geographic coordinates of each feature will also be recorded in the underlying data A digital map image is considered georeferenced if a pair of mathematical functions, f, and g, have been defined that can be used to convert back and forth between the coordinates of the map image (as defined by the pixels of the image) and the corresponding longitude and latitude of the location of that point. That is, f and g do the following:

1. If (x, y) represents a location on the digital map image, then f(x, y)=(Lon, Lat) represents the longitude and latitude of the corresponding physical location.

2. If (Lon, Lat) represents a physical location that lies within the region covered by the map, then g(Lon, Lat)=(x, y) represents the point on the digital map image that corresponds to that longitude and latitude.

Here, x and y represent the natural internal coordinate system of the map image. Typically, as described above, a digital raster map image uses the pixels of its image as a natural coordinate matrix. However, in most cases, a vector-based map image uses longitude and latitude as its internal coordinate system; if so, it can be considered to be trivially georeferenced already. Therefore, the functions f( ) and g( ) above are non-trivial georeferencing functions required to convert back and forth between coordinate systems.

Figure 4:
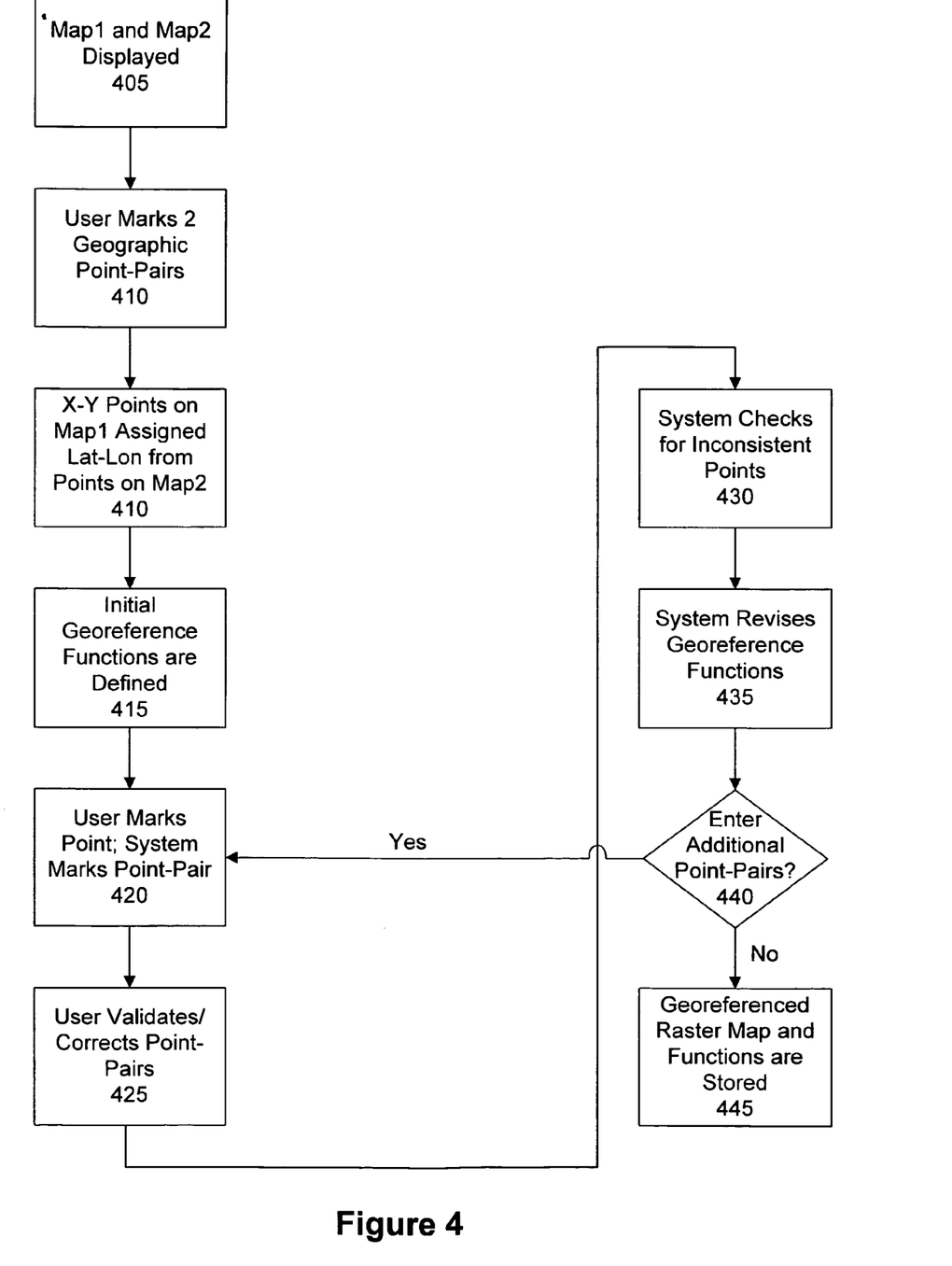
FIG. 4 is a flowchart of a process in accordance with a preferred embodiment of the present invention.

Following is a description of a georeferencing process in accordance with the preferred embodiment:

First, the raster map to be georeferenced (referred to as Map1) is displayed on a computer monitor in conjunction with another previously georeferenced map (referred to as Map2) (step 400). Typically, Map2 will be a vector map, but could also be another raster map, for which georeferencing functions are already known. Map1 and Map2 can be independently manipulated for rotation, position and scale. The user will manipulate the maps until the region shown in Map1 is contained within the region shown by Map2.

Next, pairs of points representing identical geographic locations on Map1 and Map2 are identified, and the user uses a keyboard, mouse, or other pointing device to mark these point-pairs (step 405). For each point-pair, one point is marked on Map1 and the other point is marked at the corresponding location on Map2. Examples of common georeferencing point-pairs include street intersections, places where rivers cross roads, mountain peaks, building locations, and other readily identifiable map features. If any points on Map1 have points of known longitude and latitude already marked on the map, then a georeferencing point-pair can be obtained by marking that point on Map1 and moving to the point with identical latitude and longitude on Map2 and marking it as the other half of the point-pair. Alternatively, once the known points are marked with the known latitude and longitude, they can be used to determine the georeferencing functions without requiring a corresponding mark on Map2.

After a point-pair is marked, the x-y point on Map1 is assigned the corresponding latitude and longitude of its matching point on Map2 (step 410).

When two georeferencing point-pairs are marked, the system will compute georeference functions for Map1 based on a linear transformation that allows an arbitrary rotation and predefined scaling, between the x-y domain and the latitude-longitude domain (step 415).

To improve accuracy and allow increased generality, more georeferencing point-pairs will frequently be desired. To facilitate the process of gathering these additional georeferencing point-pairs, Map1 and Map2 are now selectively synchronized. This means that as either map is zoomed, panned, scrolled, or otherwise caused to display a different region, then the other map automatically does the same. This greatly increases the ease with which georeferencing point-pairs can be identified and marked on the maps, since when the user of the system locates an identifiable feature on one map, the other map will automatically be showing very nearly the same location on the other map.

Thereafter, when the user marks a georeferencing point on one of the maps, then the system automatically marks the corresponding point on the other map, based on its current georeferencing function (step 420). The user can then make corrections to the location of a point marked by the system in this way (step 425). The user may enter as many point-pairs as are desired; each additional point-pair will increase the accuracy of the georeferencing process.

When three or more georeferencing point-pairs are determined, the system computes georeference functions for Map1 based on a completely general linear transformation between the x-y domain and the latitude-longitude domain.

When four or more georeferencing point-pairs are determined, the general linear georeferencing functions are over-determined. This means that more than the required amount of information to compute the general linear georeferencing functions is available, but that it is not, in general, completely consistent. The system uses the extra information contained in the additional georeferencing points to provide validation checks to protect against the possibility that some of the data points may be inaccurate (step 430). Points that deviate excessively with respect to a calculated standard error are presumed to be inaccurate and are omitted from the calculation of the georeferencing functions. Note that as new points are added, the system also rechecks points previously marked as inconsistent, to determine if those points should now be considered when recomputing the georeferencing functions.

The additional point-pairs allow the system to compute the general linear georeferencing functions which best fit the combination of all the available georeferencing point-pairs, so that the active georeferencing functions are revised with each new point-pair (step 435). According to the preferred embodiment, this is done by using a "least square" parameter fitting operation.

The user may then proceed to enter the next point-pair (step 440). When the user is finished, the system stores the active georeferencing functions with the raster-map (step 445). At this time, the raster map is considered fully georeferenced. When accessed at any future time, the system may simply retrieve the georeferencing functions, and apply them to find the latitude and longitude of any point on the raster map.

The process of determining the georeferencing function set from a set of point-pairs is believed to be within the ability of one of ordinary skill in the art. The specific approach used by the system and method of the preferred embodiment is discussed below.

At any given point in the georeferencing process a set of points P, has been specified. Let $i \in P$ denote one of the points of P. Associated value $x_i$, $y_i$, $Lat_i$ and $Lon_i$ refer to the x and y coordinates of the point on the bitmap, and the latitude and longitude of the point on the earth's surface. We also define $A \subseteq P$ to be the subset of "active" points, i.e. points which are currently being used in the calculation of the georeferencing functions. Assume that we have selected a parametric family of functions F. Functions in this family map from (x, y) to (Lon, Lat). Any function $f \in calF$ has components $f_1(x, y) = Lon$, and $f_2(x, y) = Lat$. From within this family we seek the specific function $\hat{f}$, which (in a sense to be defined below) comes closest to making the following system of equations true:

$$\hat{f}(x_i, y_i) = (Lon_i, Lat_i) \ f \text{ or } i \in A$$

Once determined, $\hat{f}$ will b the georeferencing function which is used to compute corresponding latitude and longitude values, (Lon,Lat) for any point, (x,y) on the bitmap. There are any number of possible ways to define the function that "comes closest to making (1) true." We shall follow a "least squares" approach also known in mathematics as an $L_2$ approach. This approach seeks to find the function, $\hat{f}$, which minimizes the sum of the squared differences between the actual and the predicted values of latitude and longitude. In other words, from among all the functions $f \in F$, $\hat{f}$ is the one which minimizes:

$$SSE = \Sigma [(f_1(x_i, y_i) - Lon_i)^2 + (f_2(x_i, y_i) - Lat_i)^2] \qquad (2)$$

Among various alternative methods for choosing the function $\hat{f}$ are choosing it so that it minimizes the sum of absolute errors (rather than squared errors), or so that it minimizes the largest error. Other criteria are also possible.

In what follows we shall describe methods for computing georeferencing functions based on both a "rotational linear" parametric family of functions and a "general linear" family of functions. A knowledgeable practitioner will readily perceive that this approach may be easily generalized to other parametric families of functions. Obvious candidates include nonlinear parametric families of functions arising from the projection of the earth's surface onto a flat map.

The General Linear Case: In the general linear case, we let F be the set of all possible linear transformations which map from (x, y) to (Lon, Lat). Thus $$\hat{f}(x, y) = \begin{bmatrix} \hat{a}_{11} & \hat{a}_{12} \\ \hat{a}_{21} & \hat{a}_{22} \end{bmatrix} \begin{bmatrix} x \\ y \end{bmatrix} + \begin{bmatrix} \hat{b}_1 \\ \hat{b}_2 \end{bmatrix} \qquad (3)$$

for some choice of parameters $\hat{a}_{11}$, $\hat{a}_{12}$, $\hat{a}_{21}$, $\hat{a}_{22}$, $\hat{b}_1$, and $\hat{b}_2$. If the region covered by the map to be georeferenced is not too large, then this family of functions will contain a suitable function, $\hat{f}$ whose total error is quite small. In the case where the map to be georeferenced covers a larger area than this, then the curvature of the earth must be taken into account and F is not a suitable family of functions. In such a case, nonlinear functions must be used as mentioned above. We shall not pursue that case further, since it is a straightforward extension of the procedures used in the linear case.

To find $\hat{f}$ we seek the parameters which minimize $$SSE = \sum_{i \in A} (a_{11}x_i + a_{12}y_i + b_i - Lon_i)^2 + (a_{21}x_i + a_{22}y_i + b_2 - Lat_i)^2$$

The parameter values which minimize this expression are found by solving the following two independent systems of linear equations:

$$\begin{bmatrix} n & \sum_{i \in A} x_i & \sum_{i \in A} y_i \\ \sum_{i \in A} x_i & \sum_{i \in A} x_i^2 & \sum_{i \in A} x_i y_i \\ \sum_{i \in A} y_i & \sum_{i \in A} x_i y_i & \sum_{i \in A} y_i^2 \end{bmatrix} \begin{bmatrix} b_1 \\ a_{11} \\ a_{12} \end{bmatrix} = \begin{bmatrix} \sum_{i \in A} Lon_i \\ \sum_{i \in A} x_i Lon_i \\ \sum_{i \in A} y_i Lon_i \end{bmatrix} \quad (5a)$$

$$\begin{bmatrix} n & \sum_{i \in A} x_i & \sum_{i \in A} y_i \\ \sum_{i \in A} x_i & \sum_{i \in A} x_i^2 & \sum_{i \in A} x_i y_i \\ \sum_{i \in A} y_i & \sum_{i \in A} x_i y_i & \sum_{i \in A} y_i^2 \end{bmatrix} \begin{bmatrix} b_2 \\ a_{21} \\ a_{22} \end{bmatrix} = \begin{bmatrix} \sum_{i \in A} Lat_i \\ \sum_{i \in A} Lat_i \\ \sum_{i \in A} y_i Lat_i \end{bmatrix} \quad (5b)$$

These systems can be easily solve by well-known methods, such as Gaussian Elimination, or LU factorization. The solutions yield the desired values of $\hat{a}_{11}$, $\hat{a}_{12}$, $\hat{a}_{21}$, $\hat{a}_{22}$, $\hat{b}_1$, and $\hat{b}_2$. It should be noted that equations (5a) and (5b) do not have a unique solution unless three or more non-colinear points are contained in A. Generally speaking, then, it requires 3 points to choose a georeferencing function from the family of general linear transformations. When there are four points or more, it is possible to compute a standard deviation of errors using the formula:

$$s = \sqrt{\frac{\sum_{i \in A}\left[(\hat{a}_{11} x_i + \hat{a}_{12} y_i + \hat{b}_1 - Lon_i)^2 + (\hat{a}_{21} x_i + \hat{b}_2 - Lat_i)^2\right]}{n-3}} \quad (6)$$

where s is an estimator for the amount of error to be expected between actual and predicted latitude and longitude values.

Note that the inverse georeferencing function, $\hat{f}^{-1}$ that maps from (Lon, Lat) to (x,y) is readily obtained now, by inverting the function $\hat{f}$. Having done this, it is possible to compute a similar standard deviation of error for $\hat{f}^{-1}$ which is an estimate of error as measured in the bitmap coordinates.

The Rotational Linear Case: In the, so called, rotational linear case, we let F be the set of all possible linear transformations which map from (x,y) to (Lon,Lat) and which also allow for a known scale change caused by the difference in distance per degree of latitude and per degree of longitude at any point not on the equator. Thus $$\hat{f}(x, y) = \begin{bmatrix} \frac{\hat{\beta}_3}{\gamma} & -\hat{\beta}_4 \\ -\hat{\beta}_4 & -\hat{\beta}_3 \end{bmatrix} \begin{bmatrix} x \\ y \end{bmatrix} + \begin{bmatrix} \frac{\hat{\beta}_1}{\gamma} \\ \hat{\beta}_2 \end{bmatrix} \quad (7)$$

for some choice of parameters $\hat{\beta}_1$, $\hat{\beta}_2$, $\hat{\beta}_3$, and $\hat{\beta}_4$, where $\gamma = \cos(Lat)$ is computed from the estimated latitude of the map to be georeferenced. Clearly, this is a special case of the more general linear transform described above, where we take $a_{11} = \beta_3/\gamma, a_{12} = -\beta_4, a_{21} = -\beta_4,$ $a_{22} = -\beta_3, b_1 = \beta_1/\gamma, b_2 = \beta_2.$ In theory, if the region covered by the map to be georeferenced is not too large, then this family of functions will contain a suitable function, $\hat{f}$ whose total error is quite small. In the case where the map to be georeferenced covers a larger area than this, then the curvature of the earth must be taken into account and F is not a suitable family of functions. In such a case, nonlinear functions must be used as noted above. In practice, the general linear transform will yield results which are somewhat superior to the rotational linear transform due to the former's innate ability to use arbitrary scaling factors. These arbitrary scaling factors might compensate, for example, for scaling flaws in the digital scanner used to scan in the maps. The primary advantage of the rotational linear transform is that it can be computed with only two reference points (unlike the general linear transform which requires three reference points).

To find $\hat{f}$ we seek, as before, the parameters which minimize SSE as defined in equation (4).

The parameter values which minimize this expression are found by solving the following system of linear equations:

$$\begin{bmatrix} n & 0 & \sum_{i \in A} x_i & -\sum_{i \in A} y_i \\ 0 & n & -\sum_{i \in A} y_i & -\sum_{i \in A} x_i \\ \sum_{i \in A} x_i & -\sum_{i \in A} y_i & \sum_{i \in A}(x_i^2 + y_i^2) & 0 \\ -\sum_{i \in A} y_i & -\sum_{i \in A} x_i & 0 & \sum_{i \in A}(x_i^2 + y_i^2) \end{bmatrix} \begin{bmatrix} \beta_1 \\ \beta_2 \\ \beta_3 \\ \beta_4 \end{bmatrix} =$$

$$\begin{bmatrix} \gamma \sum_{i \in A} Lon_i \\ \sum_{i \in A} Lat_i \\ \gamma \sum_{i \in A} x_i Lon_i - \sum_{i \in A} y_i Lat_i \\ -\gamma \sum_{i \in A} y_i Lon_i - \sum_{i \in A} x_i Lat_i \end{bmatrix}$$

These systems can easily solved by well-known methods, such as Gaussian Elimination, or LU factorization. The solutions yield the desire values of $\hat{\beta}_1$, $\hat{\beta}_2$, $\hat{\beta}_3$, and $\hat{\beta}_4$, which in turn yield the desire values for $\hat{a}_{11}$, $\hat{a}_{12}$, $\hat{a}_{21}$, $\hat{a}_{22}$, $\hat{b}_1$, and $\hat{b}_2$.

It should be noted that equation (8) does not have a unique solution unless two or m re points are contained in A. Generally speaking, then it requires two points to determine a georeferencing function from the family of rotational linear transformations. When there are three point s or more, it is possible to compute a standard deviation of error, s using the formula:

$$s = \sqrt{\frac{\sum_{i \in A}\left[(\hat{a}_{11} x_i + \hat{a}_{12} y_i + \hat{b}_1 - Lon_i)^2 + (\hat{a}_{21} x_i + \hat{a}_{22} y_i + \hat{b}_2 - Lat_i)^2\right]}{n-2}}$$

s is an estimator for the amount of error to be expected between actual
and predicted latitude and longitude values.

Note that the inverse georeferencing function $\hat{f}^{-1}$ that maps from (Lon, Lat) to (x,y) is readily obtained now, by inverting the function $\hat{f}$. Having done this, it is possible to compute a similar standard deviation of error for $\hat{f}^{-1}$ which is an estimate of error as measured in the bitmap coordinates.

Automatic Error Detection and Handling

When individual points are being assigned x, y, Lon, and Lat values, there is always a potential for error. To reduce the risk of incorrect georeferencing resulting from such errors, certain error handling procedures are built into the georeferencing process. The fundamental concept is that of detecting a "bad" point and then removing it from the set of active points, A. Note that removing point from A will not delete the information associate with that point, but it will cause the georeferencing parameters to be completely uninfluenced by that point. We do not wish to remove the point entirely, since it may be determined at a later stage of the georeferencing, that the point was not really bad at all, and should be-used in the georeferencing calculation. This will be clarified shortly.

Detecting Bad Points The following steps outline the bad point detection process using the general linear transform approach to georeferencing.

1. Begin by placing all existing points into the active set, A
2. If there are fewer than five active points then you are done,
Otherwise, for each of the currently active points in turn, move it (call it point k for the sake of convenience) temporarily out of the active set, and then calculate the resulting inverse georeferencing function (call it $\hat{g}^{(k)}$) and its corresponding $SSE_k$. Also, calculate the difference between the predicted value and the actual value $\delta_k = |\hat{g}^{(k)}(Lon_k, Lat_k) - (x_k, y_k)|$. Make a note of the values, $\delta_k$ and $$\delta_k / SSE_k.$$

Return point k to the active set (and move on to the next value of k.
3. From among the results found in step 2 above, find the point, k, with the largest value of $$\delta_k / SSE_k)c_1 \text{ and } \delta_k$$

which also satisfies $$\delta_k / SSE_k)c_1 \text{ and } \delta_k)c_2,$$

where $c_1$, and $c_2$ are some constants which are set according to the general level of accuracy to be expected on the particular type of map which is being georeferenced, the current number of active points, and the dots per inch of the scanned image. If there is such a point then mark it as bad (by removing it from the active set) and return to step 2 above. Otherwise you are done.

There are several things to note about this procedure. One is that allowing the value of $c_1$ and $c_2$ to change with the number of active points, makes it possible for the georeferencing system and method to utilize points which it might originally determine bad or inconsistent after a large enough sample of points has been gathered to make it clear that a lesser level of accuracy is all that can be achieved on this map. Another observation is that using this procedure it is impossible to reduce the number of active points down to less than four (unless you started with less than 4 in which case this procedure does not apply at all). This scheme means that as each new point is added, all points determined so far are considered, even those which had previously been marked bad. Thus early "misjudgments" on the part of the system can be corrected later, in light of new point information.

The same bad point detection process, can also be implemented using the rotational linear transform approach. In this case the method is capable of reducing the number of active points down as low as three (rather than four for the general linear transform approach outlined above). This can be useful when dealing with small sets of active points.

When the system is georeferencing raster map images that cover a large enough area so that the (nonlinear) curvature of the earth is a source of significant error, the system can calculate nonlinear georeferencing functions whose form corresponds to the map projection that was used to create Map1.

A specific example of the operation and application of the preferred georeferencing method may be shown with reference to the "Flood Zone Determination" business. The Federal Emergency Management Agency (FEMA) publishes a library of tens of thousands of paper maps showing various types of flood zones and their locations in the United States. A flood zone determination on a property is frequently done in the following way:

1. The address of the property is examined, and the location of the property is determined (perhaps through the use of a geocoding system, or b examining an available street map).
2. A map analyst attempts to determine which of the many thousands of FEMA flood maps will contain this property.
3. The map analyst goes to a map storage area and retrieves the desired map, often examining several maps before making a final selection.
4. Having retrieved the paper map, the map analyst next determines where, precisely, the property is located on the map.
5. Finally, the map analyst examines flood zone notations on the map at the property's location in order to determine its flood-zone status.

When performed using paper maps, the above process is difficult and quite time consuming. A database of scanned raster map images, alone, can be used to reduce the time and effort expended on step 3 above. However, georeferenced raster map images can also be used to eliminate virtually all work from steps 2 and 4 above. Since those are generally the most time consuming steps under the current process, the value of georeferenced flood maps is considerable.

Using georeferenced flood map raster images, steps 2 and 4 above, are replaced by:

2. A computer system combines the pre-designated outlines of the raster map and the georeferencing information to obtain a polygon expressed in terms of latitude and longitude that outlines the region included in each flood map. Then the system determines which of the polygons contain the address in question, which is done using a "point-in-polygon" algorithm. At the conclusion of this process, the computer system has identified a map panel (or perhaps a small number of map panels) that contains the address.

4. Since the latitude and longitude of the property are known (by virtue of a geocoding phase), the computer system can use the georeferencing of the map panels to locate the property on each of the panels found above, thus largely eliminating any need for he map analyst to scan the flood map for the address location.

Therefore, it is easily seen that by using georeferenced raster maps instead of paper maps, the process of determining flood zones is substantially automated and much more efficient.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, an transmission type mediums such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of georeferencing a raster map, comprising:
   displaying a first map in one area of a display, the first map being a digital raster map having a plurality of pixel locations;
   displaying a second map in a second area of the display, the second map being a georeferenced map having associated geographic coordinates and displaying at least a portion of an identical geographic region displayed in the raster map;
   receiving a first point on the first map and a corresponding first point on the second map, wherein the first point on the first map and the corresponding first point on the second map represent identical locations;
   receiving a second point on the first map and a corresponding second point on the second map, wherein the second point on the first map and the corresponding second point on the second map represent identical locations;
   receiving pixel coordinates for the first point on the first map and the second point on the first map;
   receiving geographic coordinates for the first point on the second map and the second point on the second map; and
   automatically computing a georeferencing function that converts between the pixel coordinates of the first map and the geographic coordinates of the second map, wherein the georeferencing function is based on the first and the second points received on the first map and the corresponding first and second points received on the second map, and assigns corresponding geographic coordinates to any one of the plurality of pixel locations.

2. The method of claim 1 further comprising receiving a verification that a point on the first map correctly matches geographically with a corresponding point on the second map.

3. The method of claim 1 wherein the first map is a portion of the second map.

4. The method of claim 1 further comprising assigning a longitude and latitude for at least one of the first point and the second point on the first map based upon the geographic coordinates read for at least one of the first point and the second point on the second map.

5. The method of claim 1 wherein at least one of the first point and the second point on the first map has a known longitude and latitude.

6. The method of claim 1 further comprising assigning geographic coordinates to an additional point received on the first map using the computed georeferencing function.

7. The method of claim 1 further comprising receiving an additional point on the first map and automatically marking a corresponding additional point on the second map as calculated by the computed georeferencing function.

8. The method of claim 7 further comprising receiving a correction of the additional point marked on the second map.

9. The method of claim 1 wherein an approximate georeferencing function is predefined.

10. A computer readable medium containing instructions executable by a computer to perform a method for georeferencing a raster map, the method comprising:
    displaying a first map in one area of a display, the first map being a digital raster map having a plurality of pixel locations;
    displaying a second map in a second area of the display, the second map being a georeferenced map having associated geographic coordinates and displaying at least a portion of an identical geographic region displayed in the raster map;
    receiving a first point on the first map and a corresponding first point on the second map, wherein the first point on the first map and the corresponding first point on the second map represent identical locations;
    receiving a second point on the first map and a corresponding second point on the second map, wherein the second point on the first map and the corresponding second point on the second map represent identical locations;
    receiving pixel coordinates for the first point on the first map and the second point on the first map;
    receiving geographic coordinates for the first point on the second map and the second point on the second map; and
    automatically computing a georeferencing function that converts between the pixel coordinates of the first map and the geographic coordinates of the second map, wherein the georeferencing function is based on the first and the second points received on the first map and the corresponding first and second points received on the second map, and assigns corresponding geographic coordinates to any one of the plurality of pixel locations.

11. The computer readable medium of claim 10 wherein the contents of the computer readable medium are also capable of verifying that a point on the first map correctly matches geographically with a corresponding point on the second map.

12. The computer readable medium of claim 10, wherein the contents of the computer readable medium are also capable of receiving an additional point on the first map and automatically marking a corresponding additional point on the second map as calculated by the computed georeferencing function.

13. The computer readable medium of claim 10, wherein the contents of the computer readable medium are also capable of assigning a longitude and latitude for at least one of the first point and the second point on the second map.

14. The method of claim 1, the method further comprising:
receiving an additional point on the first map;
receiving a corresponding additional point on the second map;
receiving geographic coordinates for the additional point on the second map; and
recomputing the georeferencing function.

15. The computer readable medium of claim 10 wherein the contents of the computer-readable medium are also capable of assigning geographic coordinates for an additional point received on the first map using the computed georeferencing function.

16. The method of claim 1 further comprising receiving an additional point on the second map and automatically marking a corresponding additional point on the first map as calculated by the computed georeferencing function.

17. A method of georeferencing a raster map, comprising:
displaying a first map in one area of a display, the first map being a digital raster map having a plurality of pixel locations;
displaying a second map in a second area of the display, the second map being a georeferenced map having associated geographic coordinates and displaying at least a portion of an identical geographic region displayed in the raster map;
receiving two or more point-pairs, each point-pair consisting of a point from the first map and a corresponding point from the second map, wherein the point-pairs are chosen such that corresponding points of each point-pair refer to the same geographic location; and
automatically computing a georeferencing function for the first map that expresses a mathematical relationship based on the two or more point-pairs and converts between pixel coordinates of an arbitrary point on the first map and corresponding geographic coordinates on the second map.

18. The method of claim 17, wherein receiving two or more point-pairs ceases once a quality of the computed georeferencing function is determined to be adequate.

19. The method of claim 1, wherein the first map and the second map are displayed in the same scale.

20. A data processing system for georeferencing a raster map, the data processing system comprising:
a display; and
a processor in communication with the display, wherein the processor executes instructions to:
display a first map in one area of the display, the first map being a digital raster map having a plurality of pixel locations;
display a second map in a second area of the display, the second map being a georeferenced map having associated geographic coordinates and displaying at least a portion of an identical geographic region displayed in the raster map;
receive a first point on the first map and a corresponding first point on the second map, wherein the first point on the first map and the corresponding first point on the second map represent identical locations;
receive a second point on the first map and a corresponding second point on the second map, wherein the second point on the first map and the corresponding second point on the second map represent identical locations;
receive pixel coordinates for the first point on the first map and the second point on the first map;
receive geographic coordinates for the first point on the second map and the second point on the second map; and
automatically compute a georeferencing function that converts between the pixel coordinates of the first map and the geographic coordinates of the second map, wherein the georeferencing function is based on the first and the second points received on the first map and the corresponding first and second points received on the second map, and assigns corresponding geographic coordinates to any one of the plurality of pixel locations.

* * * * *